United States Patent
Oh et al.

(10) Patent No.: US 9,860,917 B2
(45) Date of Patent: Jan. 2, 2018

(54) METHOD AND APPARATUS FOR TRANSMITTING AND RECEIVING FRAME

(71) Applicant: NEWRACOM, INC., Irvine, CA (US)

(72) Inventors: Jongee Oh, Irvine, CA (US); Hyungu Park, Daejeon (KR); Hyoungjin Kwon, Daejeon (KR); Yongjin Kwon, Daejeon (KR); Ilgu Lee, Daejeon (KR); Jeongchul Shin, Daejeon (KR); Minho Cheong, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 165 days.

(21) Appl. No.: 14/695,744

(22) Filed: Apr. 24, 2015

(65) Prior Publication Data
US 2015/0312941 A1    Oct. 29, 2015

Related U.S. Application Data

(60) Provisional application No. 61/984,641, filed on Apr. 25, 2014.

(30) Foreign Application Priority Data

Aug. 18, 2014    (KR) .................. 10-2014-0106840

(51) Int. Cl.
*H04W 4/00*    (2009.01)
*H04W 74/08*    (2009.01)
*H04W 84/12*    (2009.01)

(52) U.S. Cl.
CPC ........ *H04W 74/0816* (2013.01); *H04W 84/12* (2013.01)

(58) Field of Classification Search
USPC .......................... 370/329, 328, 338, 509, 510
See application file for complete search history.

(56) References Cited

U.S. PATENT DOCUMENTS

| | | | |
|---|---|---|---|
| 2014/0328270 A1* | 11/2014 | Zhu | H04W 74/002 370/329 |
| 2015/0023335 A1* | 1/2015 | Vermani | H04B 7/0452 370/338 |
| 2016/0072654 A1* | 3/2016 | Choi | H04L 27/2602 370/329 |
| 2017/0013645 A1* | 1/2017 | Choi | H04W 74/0816 |

* cited by examiner

*Primary Examiner* — Phuongchau Ba Nguyen

(57) ABSTRACT

In a WLAN, a device receives a frame where a symbol is attached to a previous version frame, the symbol including BSS information. The device determines whether the device belongs to a BSS of the frame based on the BSS information.

16 Claims, 28 Drawing Sheets

FIG. 16

|      | HEW-SIG 1 | HEW-SIG 2 |
|------|-----------|-----------|
| 11a  | BPSK      | BPSK      |
| 11n  | QBPSK     | QBPSK     |
| 11ac | BPSK      | QBPSK     |
| HEW  | QBPSK     | BPSK      |

FIG. 17

|      | HEW-SIG 1 | HEW-SIG 2 | HEW-SIG 3 |
|------|-----------|-----------|-----------|
| 11a  | BPSK      | BPSK      | BPSK      |
| 11n  | BPSK      | QBPSK     | QBPSK     |
| 11ac | BPSK      | BPSK      | QBPSK     |
| HEW  | BPSK      | QBPSK     | BPSK      |

METHOD AND APPARATUS FOR TRANSMITTING AND RECEIVING FRAME

CROSS-REFERENCE TO RELATED APPLICATIONS

This application claims priority to and the benefit of U.S. Provisional Application No. 61/984,641, filed on Apr. 25, 2014 in the U.S. Patent and Trademark Office and priority to and the benefit of Korean Patent Application No. 10-2014-0106840, filed on Aug. 18, 2014 in the Korean Intellectual Property Office, the entire contents of which are incorporated herein by reference.

BACKGROUND (a) Field

The described technology relates generally to a frame transmitting method and apparatus and a frame receiving method and apparatus. More particularly, the described technology relates generally to a frame transmitting method and apparatus and a frame receiving method and apparatus in a wireless local area network (WLAN).

(b) Description of the Related Art

In a wireless communication network such as the WLAN, each device occupies resources using a contention-based access scheme and transmits a signal. The WLAN device uses a carrier sense multiple access (CSMA) protocol to avoid collisions. In the CSMA protocol, the WLAN device detects energy on a channel and transmits the signal only when the channel is not being used. If the detected energy is above a clear channel assessment (CCA) level, the WLAN device deems that the channel is busy and defers the transmission attempt.

The CCA level is fixed in the conventional WLAN. For example, the CCA level for 20 MHz transmission is −62 dBm in the conventional IEEE standard 802.11n.

A dynamic CCA scheme where the CCA level is not fixed but can be changed has been developed in the IEEE 802.11ah task group (IEEE 802.11ah). In the dynamic CCA scheme, after identifying a basic service set (BSS) of the received packet, the WLAN device decreases the CCA level to protect the packet when the packet belongs to its own BSS and increases the CCA level to enhance the throughput when the packet belongs to another BSS. However, since the IEEE 802.11ah task group targets the WLAN operating at 1 GHz, the dynamic CCA scheme developed by the IEEE 802.11ah task group can be used only when devices existing in the BSS support IEEE standard 802.11ah.

Recently, the IEEE 802.11ax task group has been developing a high efficiency wireless WLAN (HEW) for enhancing the system throughput in high density scenarios. In the high density scenarios, devices of the previous version (for example, IEEE standard 802.11a, IEEE standard 802.11g, IEEE standard 802.11n, or IEEE standard 802.11ac) as well as HEW devices may coexist in the BSS. Therefore, if the dynamic CCA scheme developed by IEEE 802.11ah task group is applied to the HEW, the HEW devices can use the dynamic CCA scheme only on packets transmitted as HEW formats but cannot use the dynamic CCA scheme on packets transmitted as previous formats (for example, formats based on IEEE standard 802.11a, IEEE standard 802.11g, IEEE standard 802.11n, or IEEE standard 802.11ac).

Further, the devices of the previous version can identify the BSS of packets that are being received. In this case, the devices of the previous version can identify the BSS by interpreting a medium access control (MAC) frame on a MAC level. However, errors can occur when the device interprets the MAC frame.

SUMMARY

An embodiment of the present invention provides a frame transmitting method and apparatus and a frame receiving method and apparatus for enhancing system throughput with backward compatibility with a previous version device.

According to another embodiment of the present invention, a method of receiving a frame by a device in a WLAN is provided. The method includes receiving a frame where a symbol is attached to a previous version frame, the symbol including BSS information, and determining whether the device belongs to a BSS of the frame based on the BSS information.

The method may further include setting a CCA level based on whether the device belongs to the BSS of the frame. The CCA level may be set to a first level when the device belongs to the BSS of the frame and is set to a second level being higher than the first level when the device does not belong to the BSS of the frame.

The frame may include a request to send (RTS) frame or a clear to send (CTS) frame that is a response to the RTS frame.

The method may further include determining whether the device corresponds to a destination of a subsequent frame to be transmitted after the frame based on the BSS information, and stopping demodulating the subsequent frame during a predetermined duration when the device does not correspond to the destination.

The previous version frame may include a frame supporting at least one of IEEE standard 802.11a, IEEE standard 802.11g, IEEE standard 802.11n, or IEEE standard 802.11ac.

The BSS information may be generated based on some bits of an identifier of the BSS.

The BSS information may be generated based on some bits of an identifier of the BSS and some bits of an association identifier (AID).

The symbol may be attached to an end of the previous version frame.

The symbol may further include an indication for indicating any one of an uplink and a downlink.

The symbol may further include an indication for indicating a version of the frame.

According to yet another embodiment of the present invention, a method of transmitting a frame by a device in a WLAN is provided. The method includes generating a frame where a symbol is attached to a previous version frame, the symbol including BSS information, and transmitting the frame.

The previous version frame may include a frame supporting at least one of IEEE standard 802.11a, IEEE standard 802.11g, IEEE standard 802.11n, or IEEE standard 802.11ac.

The BSS information may be generated based on some bits of an identifier of the BSS.

The BSS information may be generated based on some bits of an identifier of the BSS and some bits of an AID.

When generating the frame, the symbol may be attached to an end of the previous version frame.

The symbol may further include an indication for indicating any one of an uplink and a downlink.

The symbol may further include an indication for indicating a version of the frame.

The frame may include an RTS frame or a CTS frame that is a response to the RTS frame.

According to still another embodiment of the present invention, a frame receiving apparatus in a WLAN is provided. The frame receiving apparatus includes a transceiver and a processor. The transceiver receives a frame where a symbol is attached to a previous version frame, the symbol including BSS information. The processor determines whether a device including the frame receiving apparatus belongs to a BSS of the frame based on the BSS information.

According to further embodiment of the present invention, a frame transmitting apparatus in a WLAN is provides. The frame transmitting apparatus includes a processor and a transceiver. The processor generates a frame where a symbol is attached to a previous version frame, the symbol including BSS information. The transceiver transmits the frame.

BRIEF DESCRIPTION OF THE DRAWINGS

FIG. 14, FIG. 15, FIG. 16, and FIG. 17 show various examples of a frame version auto-detection in a wireless communication network according to an embodiment of the present invention.

DETAILED DESCRIPTION OF THE EMBODIMENTS

Figure 1:
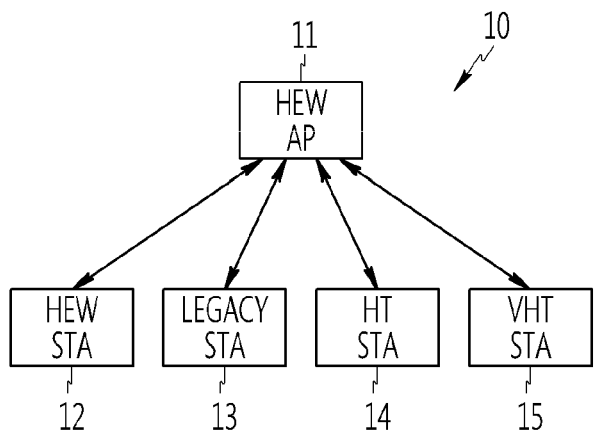
FIG. 1 and FIG. 2 show examples of a wireless communication network according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Figure 2:
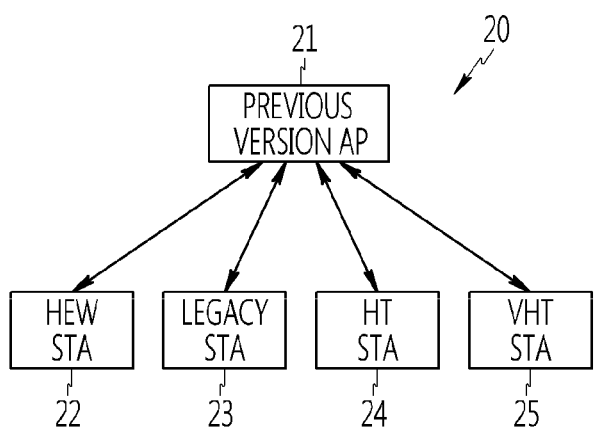
Figure 3:
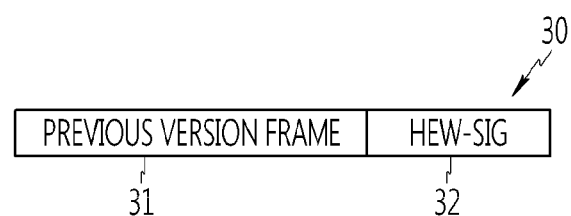
FIG. 3 schematically shows a frame structure of a wireless communication network according to an embodiment of the present invention.

FIG. 1 and FIG. 2 show examples of a wireless communication network according to an embodiment of the present invention, and FIG. 3 schematically shows a frame structure of a wireless communication network according to an embodiment of the present invention.

Referring to FIG. 1, a BSS 10 includes a plurality of devices. The device (i.e., WLAN device) may include a medium access control (MAC) layer and a physical (PHY) layer according to the IEEE (Institute of Electrical and Electronics Engineers) 802.11 standard. In the plurality of devices, at least one device may be an access point (AP) 11, and the other devices may be non-AP stations (non-AP STA) 12, 13, 14, and 15. In general, the AP STA and the non-AP STA may be collectively called the STA. However, for easy description, only the non-AP STA is called the STA.

The AP 11 supports a wireless communication network according to an embodiment of the present invention. For example, the wireless communication network according to an embodiment of the present invention may be a high efficiency WLAN (HEW) that is being developed by the IEEE 802.11ax task group. Hereinafter, the wireless communication network according to an embodiment of the present invention is assumed as the HEW for convenience. The AP supporting the HEW is called a HEW-AP.

The STAs 12, 13, 14, and 15 included in the BSS 10 may include the STA (hereinafter referred to as "HEW-STA") 12 supporting the HEW and/or the STAs 13, 14, and 15 of the previous version. The STAs of the previous version may include, for example, an STA (hereinafter referred to as a "legacy-STA") 13 supporting IEEE standard 802.11a or 802.11g (IEEE Std 802.11a-1999 or IEEE Std 802.11g-2003), an STA (hereinafter referred to as an "HT-STA") 14 supporting IEEE standard 802.11n (IEEE Std 802.11n-2009) for enhancements for higher throughput (HT), or an STA (hereinafter referred to as a "VHT-STA") 15 supporting IEEE standard 802.11ac (IEEE Std 802.11ac-2013) for enhancements for very high throughput (VHT).

In the BSS 10, the HEW-AP 11 may transmit a HEW frame that can be demodulated only by the HEW-STA 12 or a HEW-AP (not shown), but may transmit a previous version frame that can be demodulated by the previous version STAs 13 to 15 or a previous version AP (not shown). The HEW-STA 12 may transmit the HEW frame or the previous version frame. On the other hand, the HEW-AP 11 may transmit the previous version frame that can be demodulated by the previous version STAs 13 to 15, the previous version AP, the HEW-STA 12, or the HEW-AP, but may transmit a frame that can be interpreted only by the HEW-STA 12 or the HEW-AP. Similarly, the HEW-STA 12 may transmit the previous version frame that can be demodulated by the previous version STAs 13 to 15, the previous version AP, the HEW-AP 11, or the HEW-STA, but may transmit a frame than can be interpreted only by the HEW-AP 11 or the HEW-STA.

Referring to FIG. 2, a BSS 20 includes a previous version AP 21. The previous version AP may include, for example, an AP (hereinafter referred to as an "legacy-AP") supporting IEEE standard 802.11a or 802.11g, an AP (hereinafter referred to as an "HT-AP") supporting IEEE standard 802.11n, or an AP (hereinafter referred to as a "VHT-AP") supporting IEEE standard 802.11ac. The BSS 20 includes a HEW-STA 22, and may further include previous version STAs 23, 24, and 25. The previous version STAs may include, for example, a legacy-STA 23, an HT-STA 24, or a VHT-STA 25.

In the BSS 20, the previous version AP 21 or the previous version STAs 23 to 25 may transmits a previous version frame, and the HEW-STA 22 may transmit a HEW frame or the previous version frame. The HEW-STA 22 may transmit the previous version frame than can be demodulated by the previous version STAs 23 to 25, the previous version AP 21, a HEW-AP (not shown) or a HEW-STA (not shown), but may transmit a frame than can be interpreted only by the HEW-AP 21 or the HEW-STA According to an embodiment of the present invention, as shown in FIG. 3, the HEW-AP 11 or the HEW-STA 12 or 22 transmits a frame 30 where a symbol 32 is included in a previous version frame 31. The symbol 32 includes information on a BSS to which the HEW-AP or HEW-STA transmitting the frame 30 belongs. A signal symbol, i.e., a HEW signal symbol (HEW-SIG), may be used as an example of the symbol 32. Hereinafter, the symbol 32 is assumed as the HEW signal symbol (HEW-SIG).

The HEW-STA or HEW-AP receiving the frame 30 can interpret an entire part of the frame 30 including the HEW-SIG. However, the previous version STA or the previous version AP can interpret only a part corresponding to the previous version frame.

The HEW-AP or HEW-STA receiving the frame 30 can determine based on the HEW-SIG 32 whether the HEW-AP or HEW-STA having transmitted the frame 30 belongs to its own BSS. The HEW-AP or HEW-STA receiving the frame 30 applies a low CCA level when the HEW-AP or HEW-STA having transmitted the frame 30 is included in its own BSS. The HEW-AP or HEW-STA receiving the frame 30 applies a high CCA level when the HEW-AP or HEW-STA having transmitted the frame 30 is not included in its own BSS. Accordingly, when the received frame belongs to its own BSS, the HEW-AP or HEW-STA uses the low CCA level. If the energy detected on the received frame is higher than the CCA level, the HEW-AP or HEW-STA deems that the channel is busy and defers the transmission attempt, thereby protecting the frames belonging to its own BSS. When the received frame does not belong to its own BSS, the HEW-AP or HEW-STA uses the high CCA level. If the energy detected on the received frame is lower than the CCA level, the HEW-AP or HEW-STA occupies the channel, thereby enhancing the system throughput.

As described above, in the scenarios where the previous version AP or STA and the HEW-AP or HEW-STA coexist, the HEW-AP or HEW-STA can use the dynamic CCA scheme. Further, because the HEW-AP or HEW-STA can acquire BSS information by demodulating the signal symbol without interpreting the data field, the BSS information can be identified on a PHY level.

Next, various examples of a frame according to an embodiment of the present invention are described with reference to FIG. 4, FIG. 5, FIG. 6, and FIG. 7.

FIG. 4, FIG. 5, FIG. 6, and FIG. 7 schematically show various examples of frame structures according to an embodiment of the present invention. One unit shown in FIG. 4 to FIG. 7 corresponds to one symbol, and may have, for example, a length of 4 µs. Frames shown in FIG. 4 to FIG. 7 are PHY frames, and may be, for example, PLCP (physical layer convergence procedure) frames.

Figure 4:
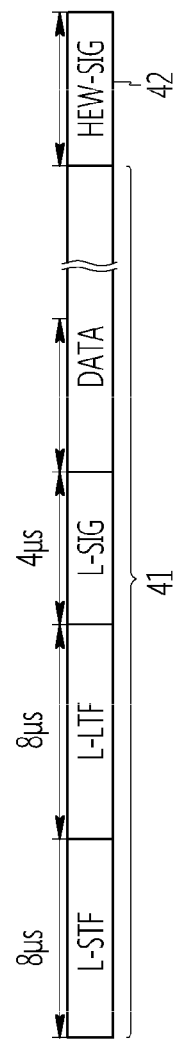
FIG. 4, FIG. 5, FIG. 6, and FIG. 7 schematically show various examples of frame structures according to an embodiment of the present invention.

Referring to FIG. 4, an example of a frame according to an embodiment of the present invention has a structure where a HEW signal symbol (HEW-SIG) 42 is added to a frame (hereinafter referred to as a "legacy frame") according to IEEE standard 802.11a or 802.11g.

A legacy frame part 41 includes a short training field (L-STF), a long training field (L-LTF), a signal field (L-SIG), and a data field. The data field includes data to be transmitted, and the L-SIG indicates a length of the data included in the data field and a data rate used for transmission of the data.

The HEW-SIG 42 includes BSS information, and is attached to a predetermined position (for example, an end of the legacy frame part 41) of the frame.

Accordingly, upon receiving the frame shown in FIG. 4, a previous version STA or AP can interpret a part (i.e., the data field) corresponding to the length indicated by the L-SIG. The previous version STA or AP interprets a MAC frame mapped on the data field on a MAC level, thereby acquiring the data included in the data field.

A HEW-STA or HEW-AP can acquire the BSS information by demodulating the HEW-SIG 42 of the predetermined position on the PHY level when receiving the frame shown in FIG. 4. Further, the HEW-STA or HEW-AP can interpret the data field like the previous version STA or AP.

In some embodiments, since the L-SIG has one reserved bit in the legacy frame, an indication for indicating whether the frame includes the HEW-SIG 42 may be allocated to the reserved bit.

Figure 5:
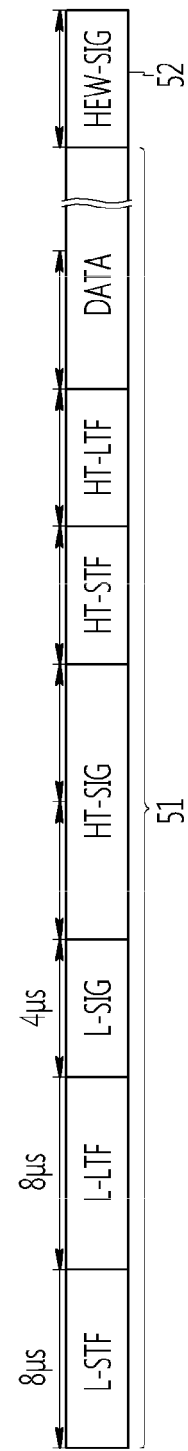

Referring to FIG. 5, another example of a frame according to an embodiment of the present invention has a structure where a HEW signal symbol (HEW-SIG) 52 is added to a frame 51 (hereinafter referred to as an "HT frame") according to IEEE standard 802.11n.

The HT frame part 51 includes a short training field (L-STF), a long training field (L-LTF), a signal field (L-SIG), an HT signal field (HT-SIG), an HT short training field (HT-STF), an HT long training field (HT-LTF), and a data field.

The L-SIG indicates a length from the HT-SIG to the data field, and the HT-SIG carries information necessary for interpreting the HT frame. The HT-STF and the HT-LTF correspond to a preamble of the HT frame, and the data field includes data to be transmitted. A single HT-LTF is shown in FIG. 5, but a plurality of HT-LTFs may be repeated.

The HEW-SIG 52 includes BSS information, and is attached to a predetermined position (for example, an end of the HT frame part 51) of the frame.

Accordingly, upon receiving the frame shown in FIG. 5, an HT-STA or HT-AP can interpret a part corresponding to the length indicated by the L-SIG, thereby acquiring the data included in the data field. When receiving the frame shown in FIG. 5, a HEW-STA or HEW-AP can acquire the BSS information by demodulating the HEW-SIG 52 of the predetermined position and can interpret the data field like the HT-STA or HT-AP.

In the HT frame, the HT-SIG indicates a length of the data field, and the L-SIG indicates the length from the HT-SIG to the data field. In some embodiments, the length indicated by the L-SIG may be increased by one symbol. Then, the HEW-STA or HEW-AP can identify whether the frame includes the HEW-SIG 52 by comparing the length indicated by the L-SIG with the length indicated by the HT-SIG.

Figure 6:
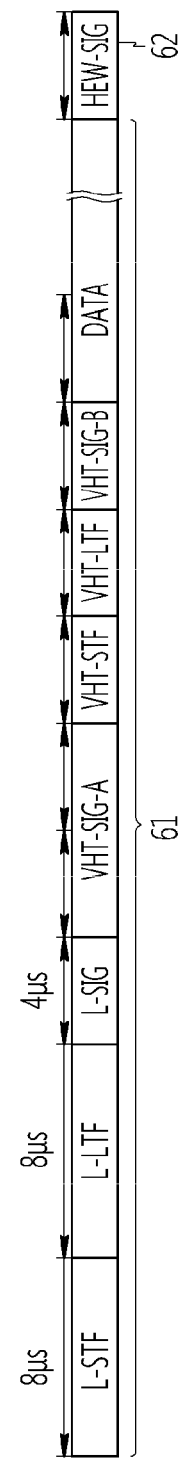

Referring to FIG. 6, yet another example of a frame according to an embodiment of the present invention has a structure where a HEW signal symbol (HEW-SIG) 62 is added to a frame 61 (hereinafter referred to as a "VHT frame") according to IEEE standard 802.11ac.

The VHT frame part 61 includes a short training field (L-STF), a long training field (L-LTF), a signal field (L-SIG), a VHT signal field (VHT-SIG-A), a VHT short training field (VHT-STF), a VHT long training field (HT-LTF), an additional VHT signal field (VHT-SIG-B), and a data field.

The L-SIG indicates a length from the VHT-SIG-A to the data field, and the VHT-SIG-A and the VHT-SIG-B carry information necessary for interpreting the VHT frame. The VHT-STF and the VHT-LTF correspond to a preamble of the VHT frame, and the data field includes data to be transmitted. A single VHT-LTF is shown in FIG. 6, but a plurality of VHT-LTFs may be repeated.

The HEW-SIG 62 includes BSS information, and is attached to a predetermined position (for example, an end of the VHT frame part 61) of the frame.

Accordingly, upon receiving the frame shown in FIG. 6, a VHT-STA or VHT-AP can interpret a part corresponding to the length indicated by the L-SIG, thereby acquiring the data included in the data field. When receiving the frame shown in FIG. 6, a HEW-STA or HEW-AP can acquire the BSS information by demodulating the HEW-SIG 62 of the predetermined position and can interpret the data field like the HT-STA or HT-AP.

In the VHT frame, the VHT-SIG-B indicates a length of the data field, and the L-SIG indicates the length from the VHT-SIG-A to the data field. In some embodiments, the length indicated by the L-SIG may be increased by one symbol. Then, the HEW-STA or HEW-AP can identify whether the frame includes the HEW-SIG 62 by comparing the length indicated by the L-SIG with the length indicated by the VHT-SIG-B.

Figure 7:
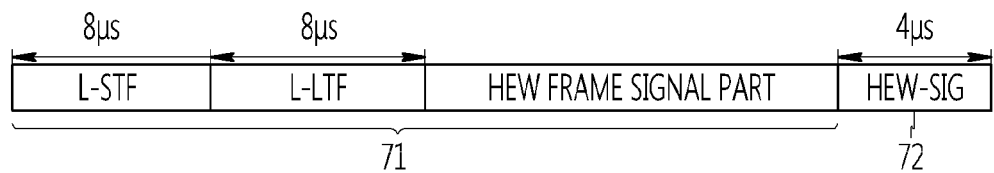

Referring to FIG. 7, a further example of a frame according to an embodiment of the present invention includes a HEW frame part 71 and a HEW signal symbol (HEW-SIG) 72.

The HEW frame part 71 includes a HEW frame signal part, and may further include a short training field (L-STF) and a long training field (L-LTF). The HEW frame signal part may include a signal field, a training field, and a data field. The HEW frame part 71 will be defined by the IEEE 802.11ax task group.

The HEW-SIG 72 includes BSS information, and is attached to a predetermined position (for example, an end of the HEW frame part 71) of the frame.

When receiving the frame shown in FIG. 7, a HEW-STA or HEW-AP can acquire the BSS information by demodulating the HEW-SIG 72 of the predetermined position.

Next, a structure of a HEW signal symbol in a wireless communication network according to an embodiment of the present invention is described with reference to FIG. 8 to FIG. 17.

Figure 8:
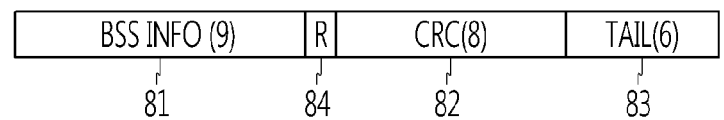
FIG. 8, FIG. 9, FIG. 10, FIG. 11, and FIG. 12 show examples of a HEW signal symbol in a wireless communication network according to an embodiment of the present invention.
Figure 9:
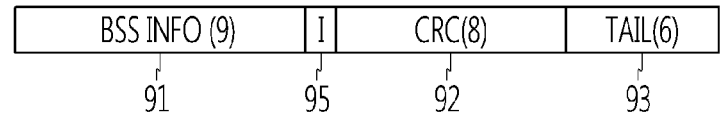
Figure 10:
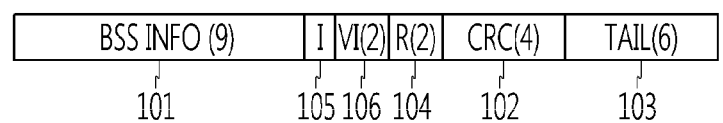

FIG. 8, FIG. 9, and FIG. 10 show examples of a HEW signal symbol in a wireless communication network according to an embodiment of the present invention.

Referring to FIG. 8, a HEW signal symbol (HEW-SIG) includes BSS information 81. The BSS information 81 may be generated based on a basic service set identifier (BSSID) for identifying a BSS. In some embodiments, some bits of the BSSID may be used as the BSS information 81. Alternatively, bits into which the some bits of the BSSID and the other information are combined may be used as the BSS information 81.

In one embodiment, a partial association ID (AID) may be used as the BSS information 81. The AID is an identifier (ID) of a STA assigned by an AP during association of the STA with the AP. In the case of the BSS information 81 in an uplink frame transmitted by the HEW-STA, the partial AID may include some bits of the BSSID [for example, 9 least significant bits (LSBs) of the BSSID]. In the case of the BSS information 81 in a downlink frame transmitted by the HEW-AP, the partial AID may include bits generated by combining some bits of the BSSID and some bits of the AID. For example, the partial AID in the downlink frame may have 9 bits and be defined as Equation 1.

$$(dec(AID[0:8]) + dec(BSSID[44:47] \oplus BSSID[40:43]) \times 2^5) \bmod 2^9 \qquad \text{Equation 1}$$

Here, $\oplus$ denotes a bitwise exclusive OR operation, dec(A[b:c]) is the cast to decimal operator where b is scaled by $2^0$ and c by $2^{c-b}$, AID[b:c] represents bits b to c inclusive of the AID, and BSSID[b:c] represents bits b to c inclusive of the BSSID.

In another embodiment, the partial AID may include, as the BSS information 81 of the uplink frame, some bits of the BSSID (for example, 9 LSBs of the BSSID). The partial AID may include, as the BSS information 81 of the downlink frame, a combination of bits generated by combining some bits of the BSSID and some bits of the AID and color bits. The color bits have different values in adjacent BSSs and are used to distinguish the adjacent BSSs. For examples, the partial AID may have 9 bits whose upper 3 bits are the color bits and lower 6 bits are defined as Equation 2.

$$(dec(AID[0:8]) + dec(BSSID[44:47] \oplus BSSID[40:43]) \times 2^5) \bmod 2^6 \qquad \text{Equation 2}$$

The HEW-SIG may further include a CRC (cyclic redundancy check) 82 and tail bits 83. Remaining bits 84 of the HEW-SIG may be reserved. For example, when the HEW- SIG is modulated with BPSK (binary phase shift keying) of a ½ code rate, the HEW-SIG has 24 bits. The BSS information 81, the CRC, the tail bits, and the reserved bit may have 9 bits, 8 bits, 6 bits, and 1 bit, respectively.

Referring to FIG. 9, a HEW signal symbol (HEW-SIG) includes BSS information 91 and uplink/downlink indication 95. The uplink/downlink indication 95 indicates whether a frame is an uplink frame or a downlink frame, and may have 1 bit.

The HEW-SIG may further include a CRC 92 and tail bits 93 as described in FIG. 8.

Referring to FIG. 10, a HEW signal symbol (HEW-SIG) includes BSS information 101 and a version indication 106. The version indication 106 indicates a version of a frame, and may indicate any one from among a legacy frame, an HT frame, a VHT frame, and a HEW frame. The version indication may have 2 bits.

The HEW-SIG may further include a CRC 102 and tail bits 103 as described in FIG. 8. The HEW-SIG may further include an uplink/downlink indication 105 as described in FIG. 9. In this case, the CRC 102 may have 4 bits, and remaining 2 bits may be reserved.

Figure 11:
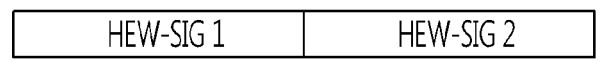
Figure 12:

FIG. 11 and FIG. 12 show other examples of a HEW signal symbol in a wireless communication network according to an embodiment of the present invention.

Referring to FIG. 11 and FIG. 12, HEW signal symbols may include two symbols (HEW-SIG1 and HEW-SIG2) or three symbols (HEW-SIG1, HEW-SIG2, and HEW-SIG3). The number of HEW signal symbols is not limited to this. The remaining bits may be reserved.

As described above, the BSS information can be provided by the HEW signal symbol. Further, the uplink/downlink indication and/or the version indication may be provided by the HEW signal symbol. Accordingly, the HEW-AP or HEW-STA can detect the uplink/downlink or version of the frame by interpreting the HEW signal symbol.

In some embodiments, an auto-detection scheme may be used instead of the uplink/downlink indication or the version indication. The auto-detection scheme is a scheme for modulating a HEW signal symbol with different modulation schemes to detect the uplink/downlink or version of the frame. These embodiments are described with reference to FIG. 13 to FIG. 17.

Figure 13:
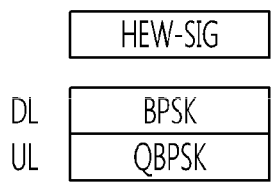
FIG. 13 shows an example of an uplink/downlink auto-detection in a wireless communication network according to an embodiment of the present invention.

FIG. 13 shows an example of an uplink/downlink auto-detection in a wireless communication network according to an embodiment of the present invention, and FIG. 14, FIG. 15, FIG. 16, and FIG. 17 show various examples of a frame version auto-detection in a wireless communication network according to an embodiment of the present invention.

In some embodiments, an uplink and a downlink may be detected by differentiating a modulation scheme of a HEW signal symbol in the uplink and downlink instead of using an uplink/downlink indication. In one embodiment, as shown in FIG. 13, the HEW signal symbol (HEW-SIG) may be modulated with BPSK in the downlink and may be modulated with QBPSK (quadrature binary phase shift keying) in the uplink. In this case, the HEW-AP or HEW-STA can identify a frame as a downlink frame when the HEW-SIG is demodulated with the BPSK, and can identify the frame as an uplink frame when the HEW-SIG is demodulated with the QBPSK.

In some embodiments, a frame version may be detected by differentiating a modulation scheme of a HEW signal symbol instead of using a version indication.

Figure 14:
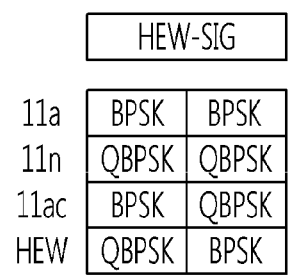

As shown in FIG. 14, FIG. 16, and FIG. 17, the frame version may be distinguished by various combinations of the BPSK and the QBPSK.

In one embodiment, referring to FIG. 14, when a HEW signal symbol (HEW-SIG) includes one symbol, all data tones of the HEW-SIG may be modulated with the BPSK in a legacy frame and all data tones of the HEW-SIG may be modulated with the QBPSK in an HT frame. One half of data tones of the HEW-SIG may be modulated with the BPSK and the other half may be modulated with the QBPSK in a VHT frame. One half of data tones of the HEW-SIG may be modulated with the QBPSK and the other half may be modulated with the BPSK in a HEW frame.

Figure 15:
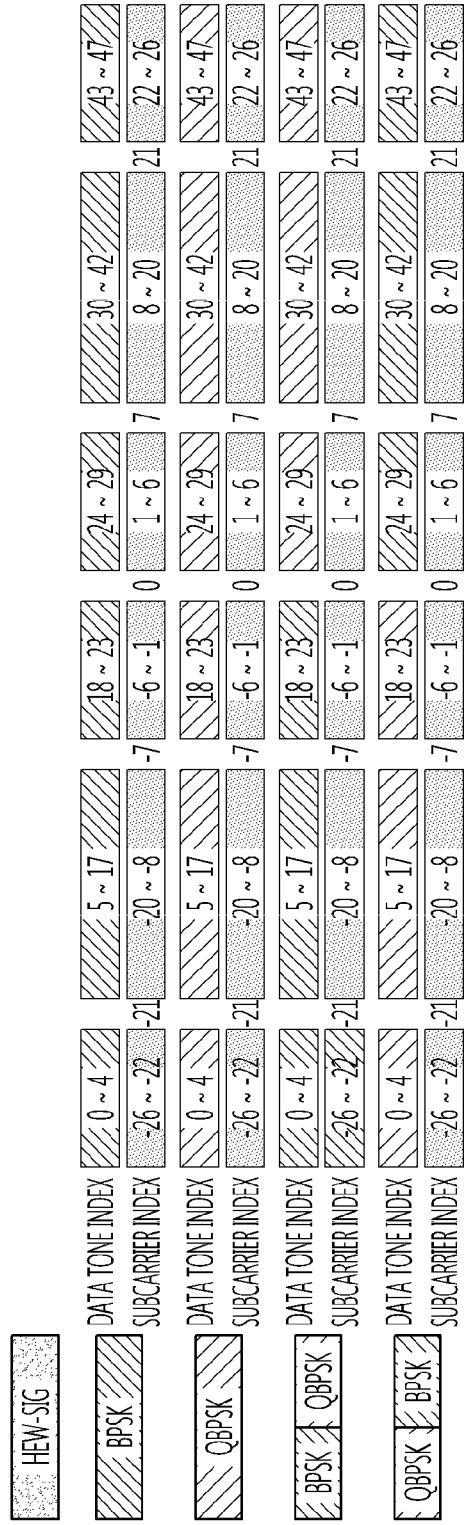

For example, when one symbol uses 64 frequency tones (−32 to 31), 48 subcarriers whose tone indices are −26 to −22, −20 to −8, −6 to −1, 1 to 6, 8 to 20, and 22 to 26 may be used as the data tones as shown in FIG. 15. Logical indices of 0 to 47 are assigned to the 48 data tones. The data tones having logical indices of 0 to 23 may be modulated with the BPSK and the data tones having logical indices of 24 to 47 may be modulated with the QBPSK in the VHT frame. The data tones having logical indices of 0 to 23 may be modulated with the QBPSK and the data tones having logical indices of 24 to 47 may be modulated with the BPSK in the HEW frame.

Referring to FIG. 16, when HEW signal symbols include two symbols (HEW-SIG1 and HEW-SIG2), both the HEW-SIG1 and HEW-SIG2 may be modulated with the BPSK in a legacy frame, and both the HEW-SIG1 and HEW-SIG2 may be modulated with the QBPSK in an HT frame. The HEW-SIG1 may be modulated with the BPSK and the HEW-SIG2 may be modulated with the QBPSK in a VHT frame. The HEW-SIG1 may be modulated with the QBPSK and the HEW-SIG2 may be modulated with the BBPSK in a HEW frame.

Referring to FIG. 17, HEW signal symbols include three symbols (HEW-SIG1, HEW-SIG2, and HEW-SIG3), and all of the HEW-SIG1, HEW-SIG2, and HEW-SIG3 may be modulated with the BPSK in a legacy frame. The HEW-SIG1 may be modulated with the BPSK and the HEW-SIG2 and HEW-SIG3 may be modulated with QBPSK in an HT frame. The HEW-SIG1 and HEW-SIG2 may be modulated with the BPSK and the HEW-SIG3 may be modulated with QBPSK in a VHT frame. The HEW-SIG1 and HEW-SIG3 may be modulated with the BPSK and the HEW-SIG2 may be modulated with QBPSK in a HEW frame.

As described above, the uplink/downlink or the frame version can be automatically detected by demodulating the HEW signal symbol.

Next, an example of a dynamic CCA operation in a wireless communication network according to an embodiment of the present invention is described with reference to FIG. 18 to FIG. 22.

Figure 18:
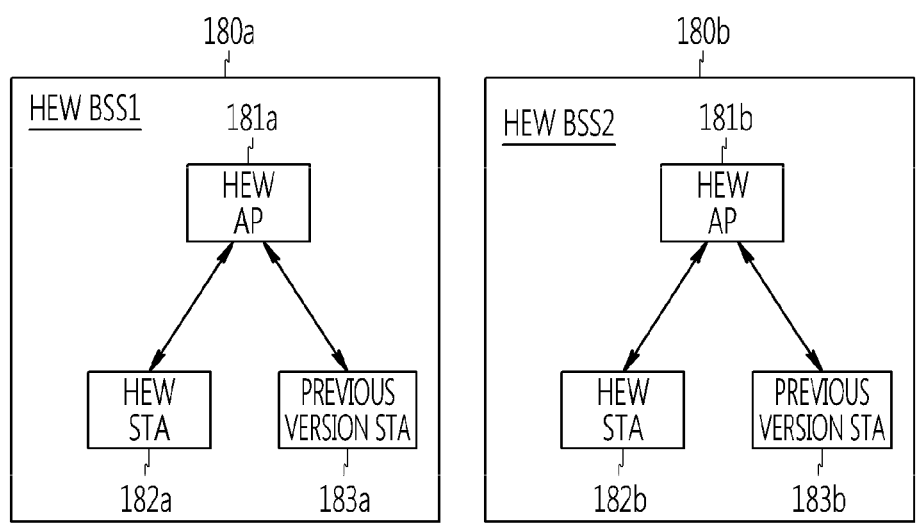
FIG. 18 is a drawing for explaining a dynamic CCA operation in a wireless communication network according to an embodiment of the present invention.
Figure 19:
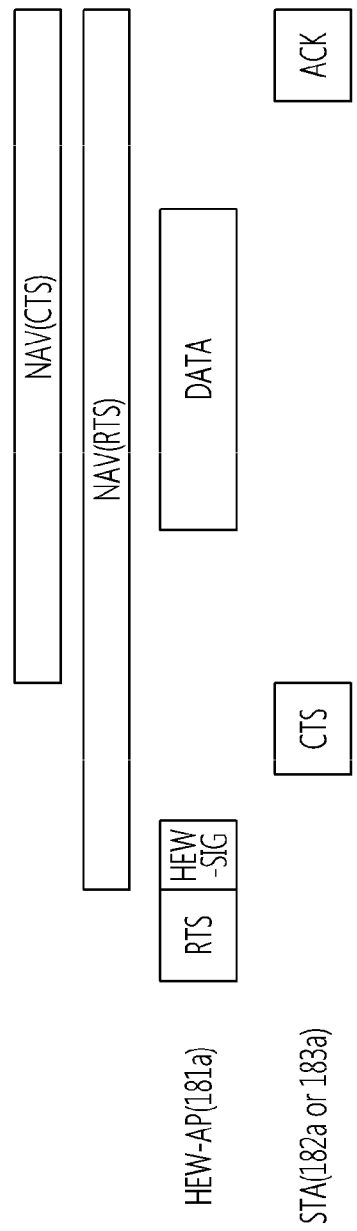
FIG. 19 shows a downlink transmission in a wireless communication network according to an embodiment of the present invention.
Figure 20:
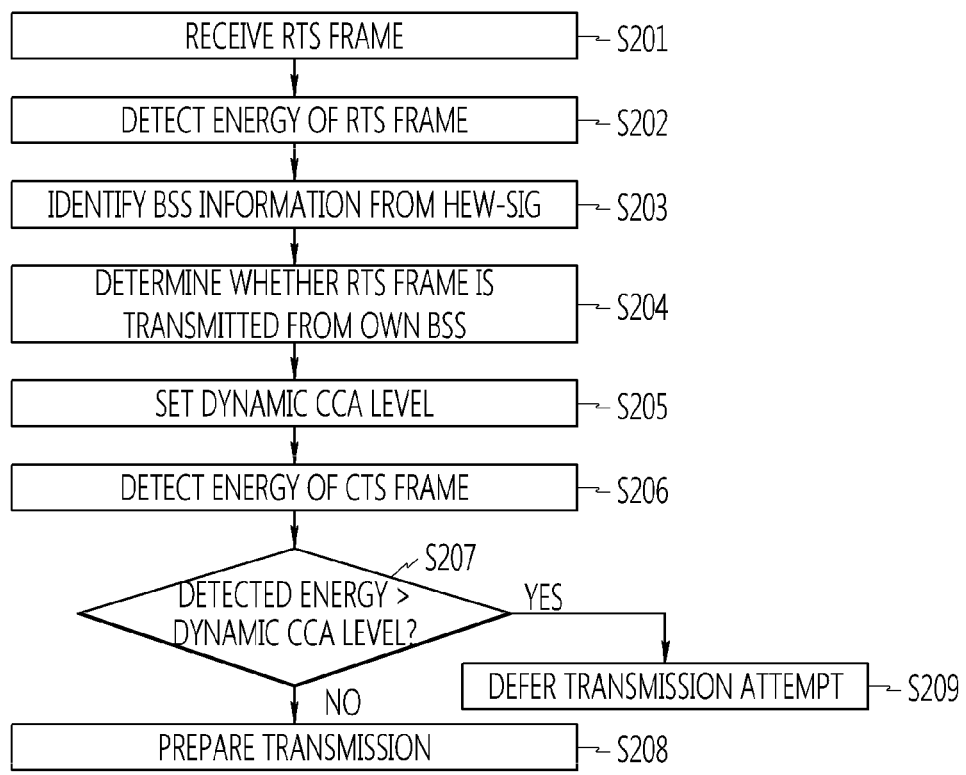
FIG. 20 is a flowchart showing a dynamic CCA operation based on a downlink transmission in a wireless communication network according to an embodiment of the present invention.
Figure 21:
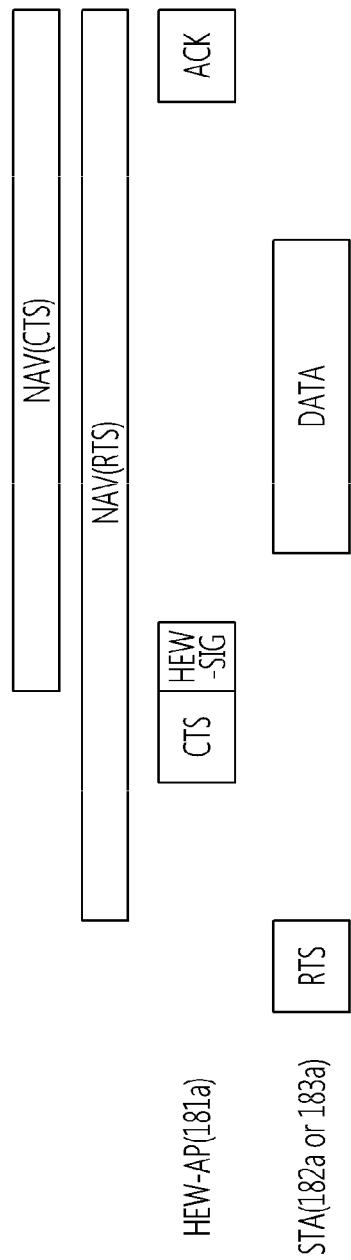
FIG. 21 shows an uplink transmission in a wireless communication network according to an embodiment of the present invention.
Figure 22:
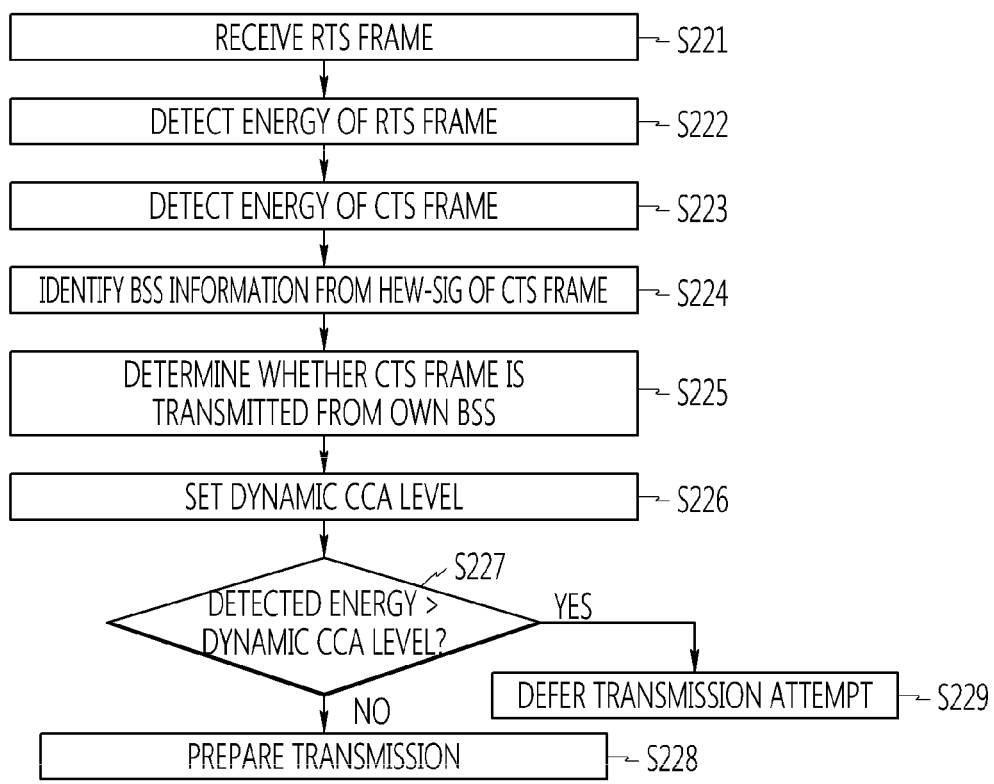
FIG. 22 is a flowchart showing a dynamic CCA operation based on an uplink transmission in a wireless communication network according to an embodiment of the present invention.

FIG. 18 is a drawing for explaining a dynamic CCA operation in a wireless communication network according to an embodiment of the present invention; FIG. 19 shows downlink transmission in a wireless communication network according to an embodiment of the present invention; FIG. 20 is a flowchart showing a dynamic CCA operation based on downlink transmission in a wireless communication network according to an embodiment of the present invention; FIG. 21 shows uplink transmission in a wireless communication network according to an embodiment of the present invention; and FIG. 22 is a flowchart showing a dynamic CCA operation based on an uplink transmission in a wireless communication network according to an embodiment of the present invention. A BSS (hereinafter referred to as a "HEW BSS") including a HEW-AP is exemplified in FIG. 18 to FIG. 22.

Referring to FIG. 18, a HEW BSS (HEW BSS1) 180a includes a HEW-AP 181a, and a HEW BSS (HEW BSS2) 180b neighboring the HEW BSS 180a includes a HEW-AP 181b. The HEW BSS 180a further includes a HEW-STA 182a and a previous version STA 183a, and the HEW BSS 180b further includes a HEW-STA 182b and a previous version STA 183b.

Referring to FIG. 19 and FIG. 20, the HEW-AP 181a transmits a request to send (RTS) frame to transmit a packet (for example, a data frame) in the HEW BSS 180a (S201). In the HEW BSS 180b, the HEW-AP 181b or HEW-STA 182b detects energy of the RTS frame transmitted by the HEW-AP 181a (S202), and identifies BSS information of the RTS frame from a HEW signal symbol (HEW-SIG) attached to the RTS frame (S203). The HEW-AP 181b or HEW-STA 182b determines whether the RTS frame is transmitted from its own BSS 180b based on the BSS information (S204), and sets a dynamic CCA level based on whether the RTS frame is transmitted from its own BSS 180b (S205). The HEW-AP 181b or HEW-STA 182b sets the dynamic CCA level to a first CCA level when the RTS frame is transmitted from its own BSS 180b and sets the dynamic CCA level to a second CCA level when the RTS frame is not transmitted from its own BSS 180b. The second CCA level is higher than the first CCA level.

The HEW-AP 181b or HEW-STA 182b detects energy of a clear to send (CTS) frame which is transmitted by the STA 182a or 183a in response to the RTS frame (S206). The HEW-AP 181b or HEW-STA 182b compares the detected energy with the dynamic CCA level (S207), and prepares to transmit the packet at a next packet transmission interval if the detected energy is lower than the dynamic CCA level (S208). If the detected energy is higher than the dynamic CCA level, the HEW-AP 181b or HEW-STA 182b determines that the channel is busy and defers a transmission attempt (S209). In one embodiment, the HEW-AP 181b or HEW-STA 182b may prepare for the transmission when both the detected energy of the RTS frame and the detected energy of the CTS frame are lower than the dynamic CCA level. In another embodiment, the HEW-AP 181b or HEW-STA 182b may defer the transmission attempt when any one of the detected energy of the RTS frame and the detected energy of the CTS frame is higher than the dynamic CCA level.

In one embodiment, the steps S201 to S209 may be sequentially performed. In another embodiment, some steps of the steps S201 to S209 may be simultaneously performed, or may be performed in a different order. For example, the steps S203, S204, and S205 for identifying the BSS information and setting the dynamic CCA level may be performed in parallel with the step S202 for detecting the energy.

Referring to FIG. 21 and FIG. 22, the STA 182a or 183a transmits an RTS frame to transmit a packet (for example, a data frame) in the HEW BSS 180a (S221). In some embodiments, a HEW signal symbol (HEW-SIG) may be attached to the RTS frame transmitted by the HEW-STA 182a. In the HEW BSS 180b, the HEW-AP 181b or HEW-STA 182b detects energy of the RTS frame transmitted by the STA 182a or 183a (S222). The HEW-AP 181b or HEW-STA 182b detects energy of a CTS frame which is transmitted by the HEW-AP 181a in response to the RTS frame (S223), and identifies BSS information from a HEW signal symbol (HEW-SIG) attached to the CTS frame (S224). The HEW-AP 181b or HEW-STA 182b determines whether the CTS frame is transmitted from its own BSS 180b based on the BSS information (S225), and sets a dynamic CCA level based on whether the CTS frame is transmitted from its own BSS 180b (S226). The HEW-AP 181b or HEW-STA 182b sets the dynamic CCA level to a first CCA level when the CTS frame is transmitted from its own BSS 180b, and sets the dynamic CCA level to a second CCA level when the CTS frame is not transmitted from its own BSS 180b. The second CCA level is higher than the first CCA level.

The HEW-AP 181b or HEW-STA 182b compares the detected energy with the dynamic CCA level (S227), and prepares to transmit the packet at a next packet transmission interval if the detected energy is lower than the dynamic CCA level (S228). If the detected energy is higher than the dynamic CCA level, the HEW-AP 181b or HEW-STA 182b determines that the channel is busy and defers a transmission attempt (S229). In one embodiment, the HEW-AP 181b or HEW-STA 182b may prepare for the transmission when both the detected energy of the RTS frame and the detected energy of the CTS frame are lower than the dynamic CCA level. In another embodiment, the HEW-AP 181b or HEW-STA 182b may defer the transmission attempt when any one of the detected energy of the RTS frame and the detected energy of the CTS frame is higher than the dynamic CCA level.

In one embodiment, the steps S221 to S229 may be sequentially performed. In another embodiment, some steps of the steps S201 to S208 may be simultaneously performed, or may be performed in a different order. For example, the steps S224, S225, and S226 for identifying the BSS information and setting the dynamic CCA level may be performed in parallel with the step S223 for detecting the energy.

As described above, the HEW-AP or HEW-STA can perform the dynamic CCA operation based on the HEW signal symbol attached to the RTS frame or CTS frame.

Figure 23:
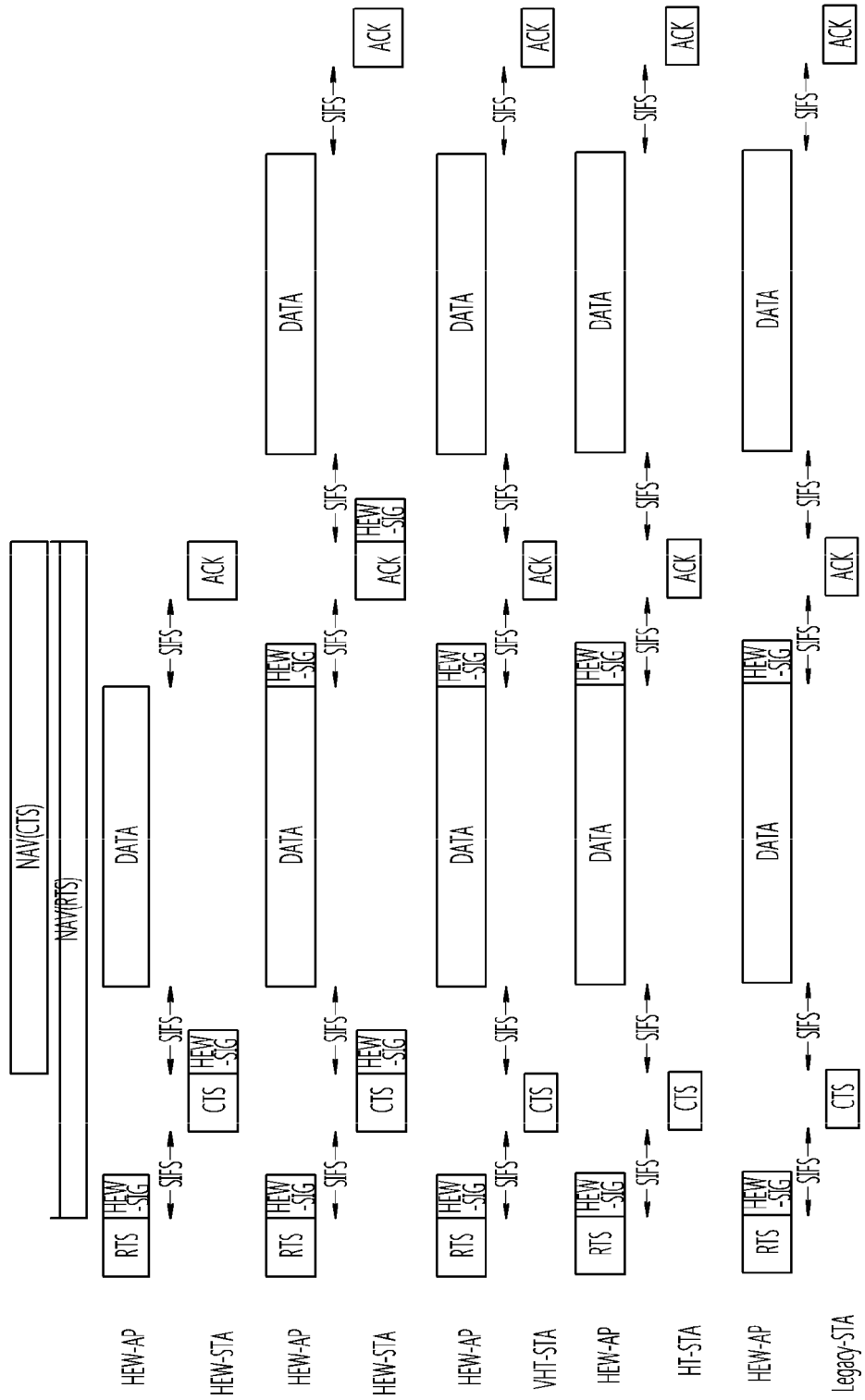
FIG. 23 and FIG. 24 show a downlink transmission in a wireless communication network according to an embodiment of the present invention.
Figure 24:
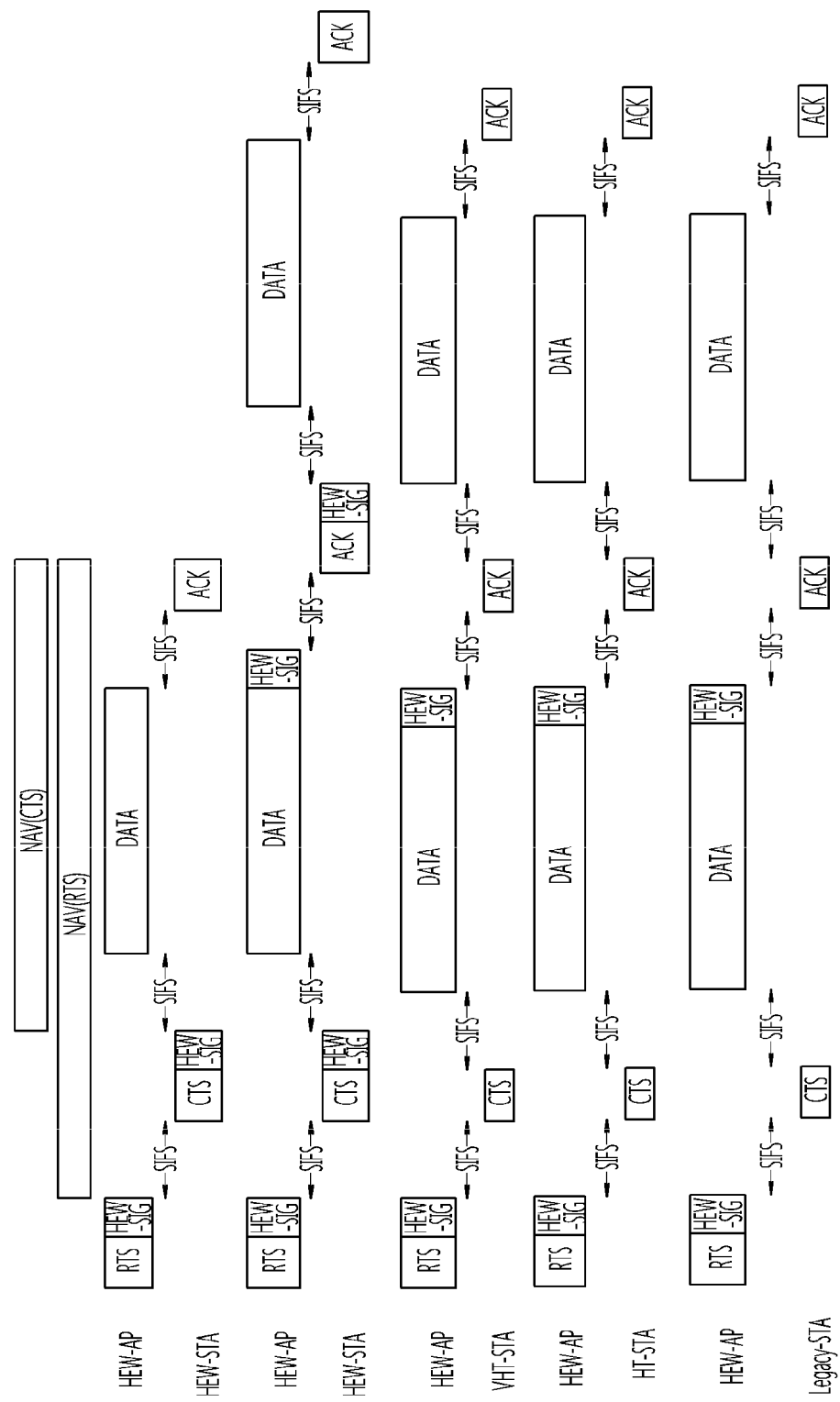
Figure 25:
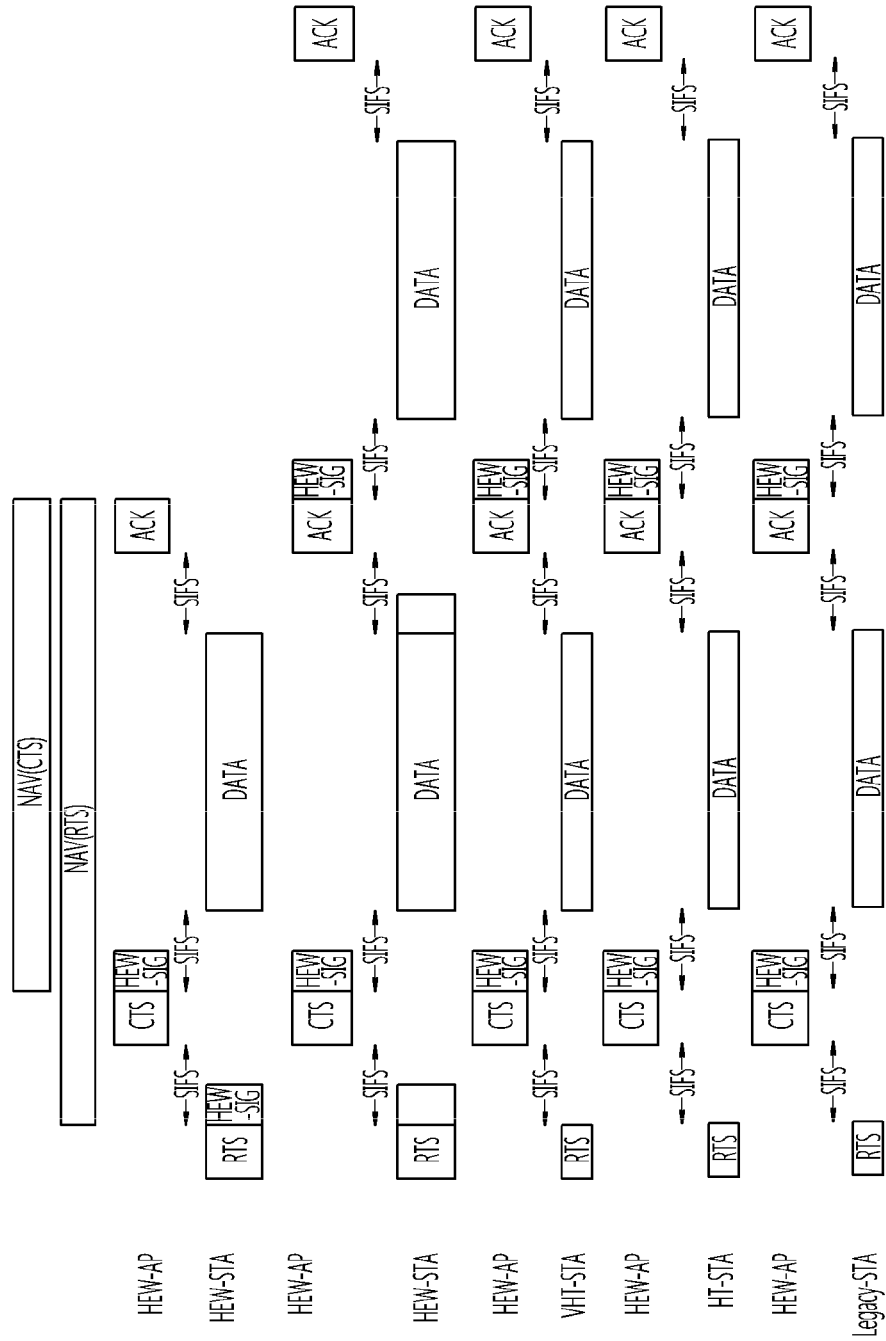
FIG. 25 and FIG. 26 show an uplink transmission in a wireless communication network according to an embodiment of the present invention.
Figure 26:
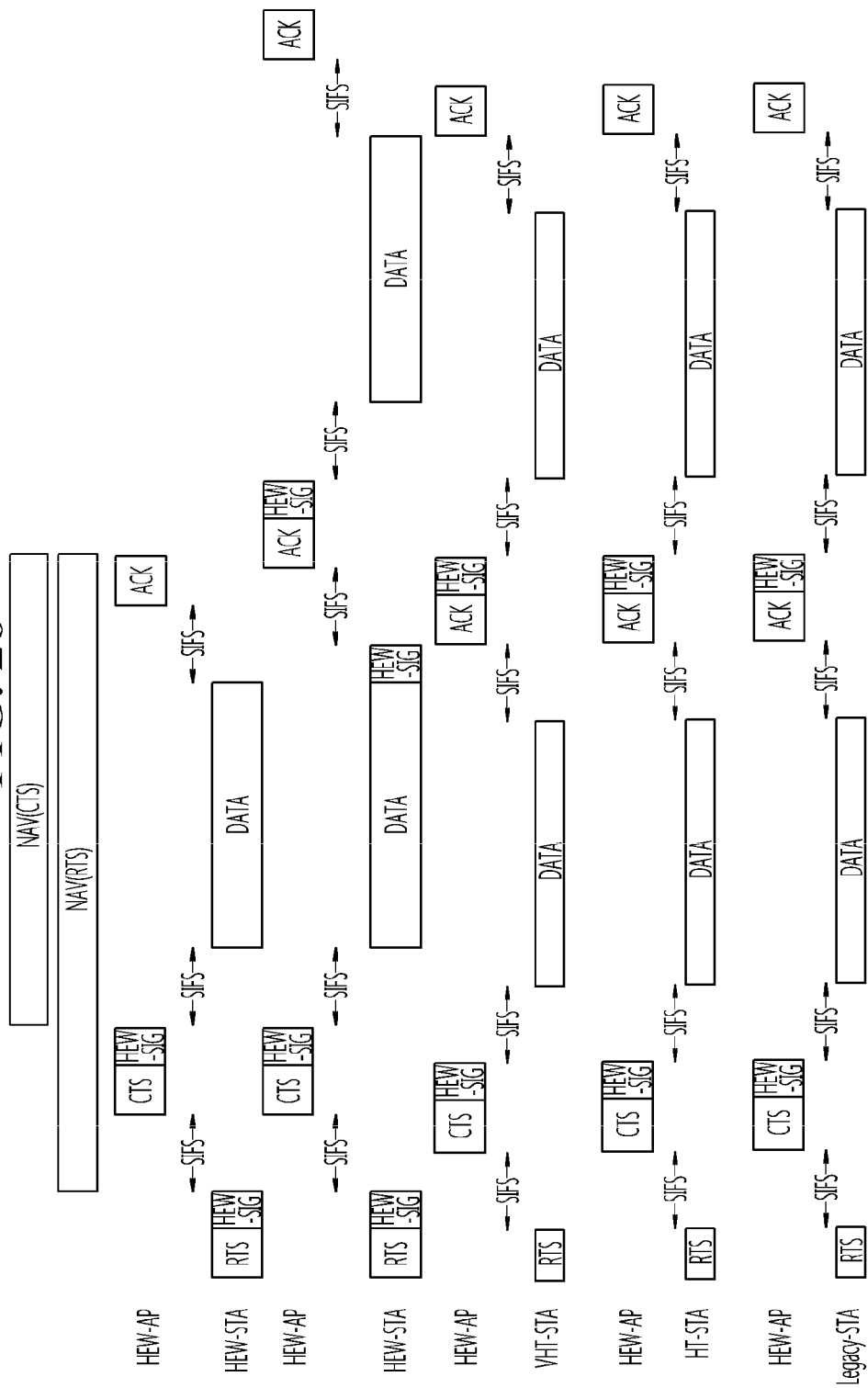

FIG. 23 and FIG. 24 show downlink transmission in a wireless communication network according to an embodiment of the present invention, and FIG. 25 and FIG. 26 show uplink transmission in a wireless communication network according to an embodiment of the present invention.

Referring to FIG. 23 and FIG. 24, a HEW-AP transmits an RTS frame including a HEW signal symbol (HEW-SIG) for downlink packet transmission. An STA that is a recipient of the RTS frame transmits a CTS frame in response to the RTS frame. The CTS frame is transmitted after a predetermined interval, for example a SIFS (short interframe space). STAs that are the recipient of the RTS frame update a NAV (network allocation vector) according to a duration value set to a duration field of the RTS frame. STAs that are the recipient of the CTS frame update the NAV according to a duration value set to a duration field of the CTS frame. It is shown in FIG. 23 that the NAV is set from a beginning of the HEW-SIG, i.e., an end of the RTS or CTS frame except the HEW-SIG. However, as shown in FIG. 24, the NAV may be set from an end of the HEW-SIG.

The HEW-AP receiving the CTS frame transmits a data frame after the SIFS. The STA that has successfully received the data frame transmits an acknowledgement (ACK) frame after the SIFS.

In this case, the HEW-AP transmits the RTS frame including the HEW-SIG, and the HEW-STA transmits the CTS frame including the HEW-SIG. Since the HEW-STA or HEW-AP can determine whether frames subsequent to the RTS or CTS frame belong to its own BSS based on BSS information of the HEW-SIG attached to the RTS or CTS frame, the frames (for example, the data frame and ACK frame) subsequent to the RTS or CTS frame may not include the HEW-SIG in one embodiment. In another embodiment, the data frame or the ACK frame may include the HEW-SIG in order to use the same frame format. In this case, as shown in FIG. 23, the HEW-SIG may be attached to only the first data frame (i.e., an initial data frame) and the first ACK frame (i.e., an initial ACK frame) that are transmitted after the RTS of CTS frame. Alternatively, a data frame or ACK frame subsequent to the first data frame or the first ACK frame may also include the HEW-SIG.

When a previous version STA (VTH-STA, HT-STA, or legacy-STA) is the recipient of the RTS frame, the VTH-STA, HT-STA, or legacy-STA transmits the CTS frame having no HEW-SIG in response to the RTS frame. Further, the VTH-STA, HT-STA, or legacy-STA transmits the ACK frame having no HEW-SIG in response to the data frame.

According to one embodiment, in the frame including the HEW-SIG, the SIFS may be counted from a beginning of the HEW-SIG, i.e., an end of the frame except the HEW-SIG as shown in FIG. 23. In another embodiment, as shown in FIG. 24, the SIFS may be counted from an end of the HEW-SIG.

Referring to FIG. 25 and FIG. 26, a HEW-STA or a previous version STA (i.e., a VHT-STA, HT-STA or legacy-STA) transmits an RTS frame for an uplink packet transmission. A HEW-AP that is a recipient of the RTS frame transmits a CTS frame in response to the RTS frame. The CTS frame is transmitted after a predetermined interval, for example a SIFS (short interframe space). STAs that are the recipient of the RTS frame update a NAV according to a duration value set to a duration field of the RTS frame. STAs that are the recipient of the CTS frame update the NAV according to a duration value set to a duration field of the CTS frame. It is shown in FIG. 25 that the NAV is set from a beginning of the HEW-SIG. However, as shown in FIG. 26, the NAV may be set from an end of the HEW-SIG.

The HEW-STA, VHT-STA, HT-STA, or legacy-STA receiving the CTS frame transmits a data frame after the SIFS. The HEW-AP that has successfully received the data frame transmits an ACK frame after the SIFS.

In this case, the HEW-STA transmits the RTS frame including the HEW-SIG, and the HEW-AP transmits the CTS frame including the HEW-SIG. Since the HEW-STA or HEW-AP can determine whether frames subsequent to the RTS or CTS frame belong to its own BSS based on BSS information of the HEW-SIG attached to the RTS or CTS frame, the frames (for example, the data frame and ACK frame) subsequent to the RTS or CTS frame may not include the HEW-SIG in one embodiment. In another embodiment, the data frame or the ACK frame may include the HEW-SIG in order to use the same frame format. In this case, as shown in FIG. 25, the HEW-SIG may be attached to only the first data frame (i.e., an initial data frame) and the first ACK frame (i.e., an initial ACK frame) that are transmitted after the RTS of CTS frame. Alternatively, a data frame or ACK frame subsequent to the first data frame or the first ACK frame may also include the HEW-SIG.

According to one embodiment, in the frame including the HEW-SIG, the SIFS may be counted from a beginning of the HEW-SIG, i.e., an end of the frame except the HEW-SIG as shown in FIG. 25. In another embodiment, as shown in FIG. 26, the SIFS may be counted from an end of the HEW-SIG.

In some embodiments, if the HEW-AP or HEW-STA fails to receive an ACK frame during a predetermined interval (ACKTimeout interval) after transmitting a data frame, the HEW-AP or HEW-STA may determine that the transmission has failed and retransmit the data frame. In this case, the HEW-AP or HEW-STA may transmit a frame including a HEW signal symbol to a previous version STA or AP. The previous version STA or AP can detect the HEW signal symbol attached to an end of the frame by energy detection. Therefore, the HEW-AP or HEW-STA may increase an ACKTimeout interval by a time of the HEW signal symbol compared with an ACKTimeout interval of a previous version. In one embodiment, ACKTimeout may be defined as Equation 3.

$$ACKTimeout=HEW\text{-}SIG\_SYMBOL\_TIME+previous\ version\ ACKTimeout \quad \text{Equation 3}$$

Here, HEW-SIG_SYMBOL_TIME represents the time of the HEW signal symbol, and the previous version ACKTimeout may be ACKTimeout defined in IEEE standard 802.11-2012 and may be defined as Equation 4

$$Previous\ version\ ACKTimeout=aSIFSTime+aSlotTime+aPHY\text{-}RX\text{-}START\text{-}Delay \quad \text{Equation 4}$$

Here, aSIFSTime represent a SIFS time, and is a nominal time that the MAC and PHY require in order to receive the last symbol of a frame at the air interface, process the frame, and respond with the first symbol on the air interface of the earliest possible response frame. Further, aSlotTime represents a slot time, and is a time that the MAC uses for defining a PIFS [PCF (point coordination function) interframe space] period and a DIFS [DCF (distributed coordination function) interframe space] period. For example, the PIFS is derived by (aSIFSTime+aSlotTime), and the DIFS is derived by (aSIFSTime+2×aSlotTime). Furthermore, aPHY-RX-START-Delay is a delay from a point in time specified by the PHY to the issuance of the PHY-RXSTART.indication primitive. PHY-RXSTART.indication primitive is an indication by the PHY to the local MAC entity that the PLCP has received a valid start.

In some embodiments, if the HEW-AP or HEW-STA fails to receive a CTS frame during a predetermined interval (CTSTimeout interval) after transmitting an RTS frame, the HEW-AP or HEW-STA may determine that the transmission has failed. In this case, the HEW-AP or HEW-STA may increase a CTSTimeout interval by a time of the HEW signal symbol compared with a CTSTimeout interval of a previous version. In one embodiment, CTSTimeout may be defined as Equation 5.

$$CTSTimeout=HEW\text{-}SIG\_SYMBOL\_TIME+previous\ version\ CTSTimeout \quad \text{Equation 5}$$

Here, the previous version CTSTimeout may be CTSTimeout defined in IEEE standard 802.11-2012 and may be defined as Equation 6.

$$Previous\ version\ CTSTimeout=aSIFSTime+aSlotTime+aPHY\text{-}RX\text{-}START\text{-}Delay \quad \text{Equation 6}$$

In some embodiments, a power saving operation may be performed based on BSS information when the BSS information includes information on an AID, for example a partial AID. A power saving operation in a wireless communication network according to an embodiment of the present invention is described with reference to FIG. 27 to FIG. 31.

Figure 27:
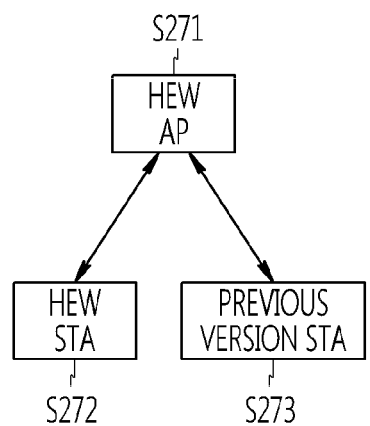
FIG. 27 is a drawing showing a power saving operation in a wireless communication network according to an embodiment of the present invention.
Figure 28:
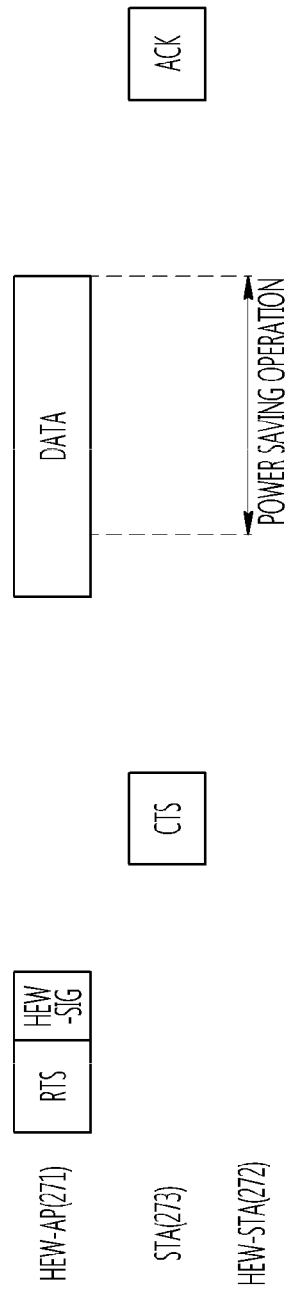
FIG. 28 shows downlink transmission in a wireless communication network according to an embodiment of the present invention.
Figure 29:
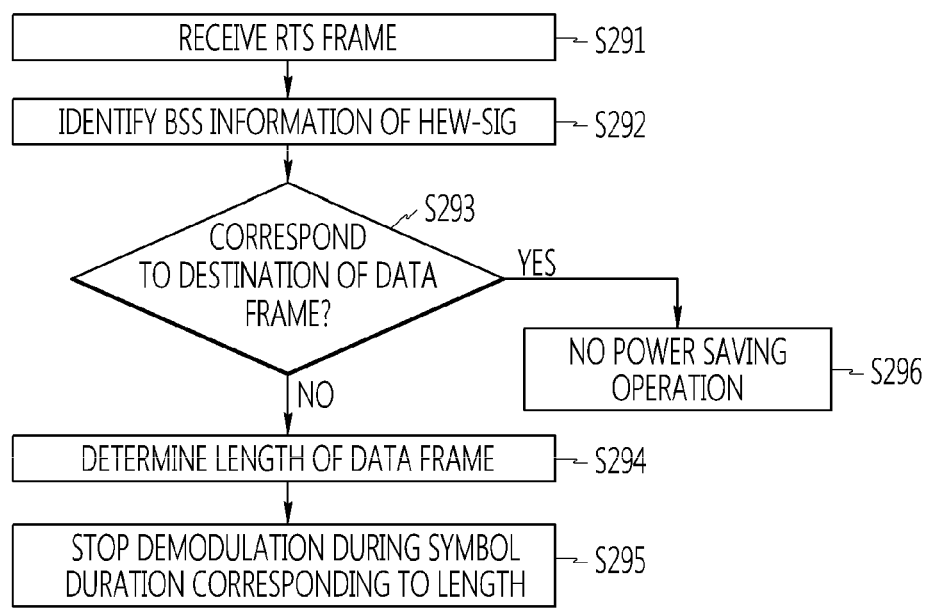
FIG. 29 is a flowchart showing a power saving operation based on a downlink transmission in a wireless communication network according to an embodiment of the present invention.
Figure 30:
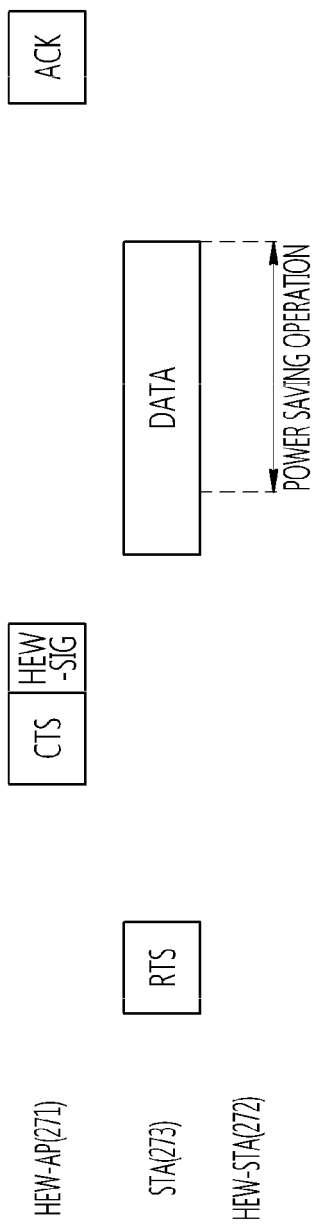
FIG. 30 shows uplink transmission in a wireless communication network according to an embodiment of the present invention.
Figure 31:
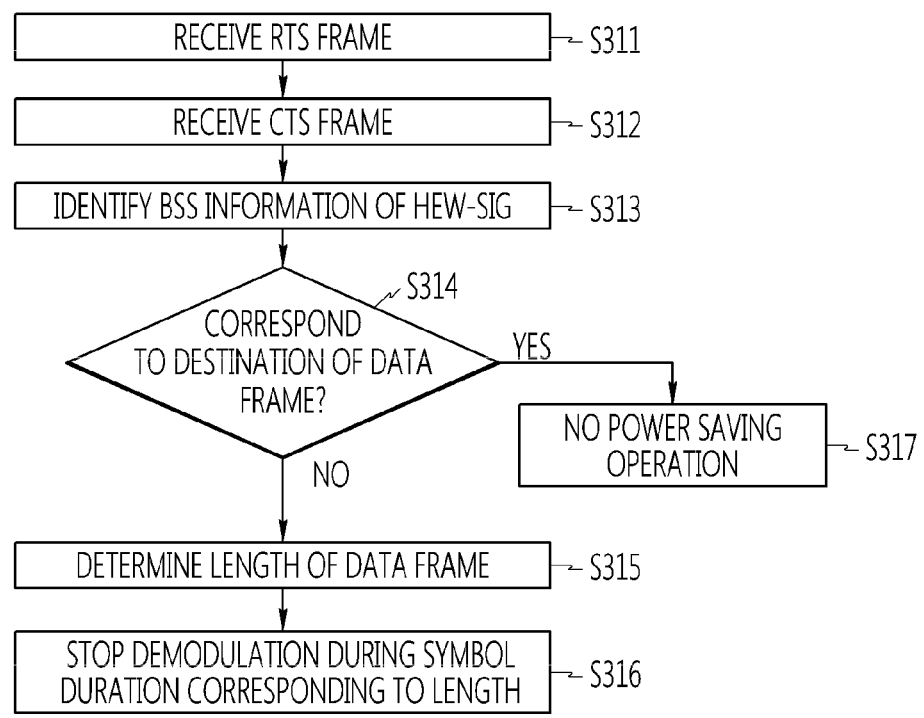
FIG. 31 is a flowchart showing a power saving operation based on an uplink transmission in a wireless communication network according to an embodiment of the present invention.

FIG. 27 is a drawing showing a power saving operation in a wireless communication network according to an embodiment of the present invention; FIG. 28 shows downlink transmission in a wireless communication network according to an embodiment of the present invention; FIG. 29 is a flowchart showing a power saving operation based on a downlink transmission in a wireless communication network according to an embodiment of the present invention; FIG. 30 shows uplink transmission in a wireless communication network according to an embodiment of the present invention; and FIG. 31 is a flowchart showing a power saving operation based on uplink transmission in a wireless communication network according to an embodiment of the present invention. A HEW BSS is exemplified in FIG. 27 to FIG. 31.

Referring to FIG. 27, a HEW BSS includes a HEW-AP 271, a HEW-STA 272, and a previous version STA 273. The previous version STA 273 may be a legacy-STA, an HT-STA, or a VHT-STA.

Referring to FIG. 28 and FIG. 29, the HEW-AP 271 transmits an RTS frame to transmit a packet (for example, a data frame) to the previous version STA 273 in the HEW BSS (S291). The previous STA 273 transmits a CTS frame in response to the RTS frame. The HEW-STA 272 identifies BSS information (i.e., a partial AID) by demodulating a HEW signal symbol (HEW-SIG) attached to the RTS frame (S292), and determines whether it corresponds to a destination of the data frame to be subsequently transmitted based on the BSS information (S293).

If the HEW-STA 272 does not correspond to the destination of the data frame, the HEW-STA 272 demodulates a signal field of the data frame to determine a length of the data frame, in particular a length of a data field included in the data frame (S294). The HEW-STA 272 stops demodulating the data frame during a symbol duration corresponding to the length (S295). As such, the HEW-STA 272 can perform the power saving by stopping demodulating the data frame. If the HEW-STA 272 corresponds to the destination of the data frame, the HEW-STA 272 does not perform the power saving and demodulates the data frame (S296).

Referring to FIG. 30 and FIG. 31, the previous version STA 273 transmits an RTS frame to transmit a packet (for example, a data frame) to the HEW-AP 271 (S311). The HEW-AP 271 transmits a CTS frame in response to the RTS frame (S312). The HEW-STA 272 identifies BSS information (i.e., a partial AID) by demodulating a HEW signal symbol (HEW-SIG) attached to the CTS frame (S313), and determines whether it corresponds to a destination of the data frame to be subsequently transmitted based on the BSS information (S314).

If the HEW-STA 272 does not correspond to the destination of the data frame, the HEW-STA 272 demodulates a signal field of the data frame to determine a length of the data frame, in particular a length of a data field included in the data frame (S315). The HEW-STA 272 stops demodulating the data frame during a symbol duration corresponding to the length (S316). As such, the HEW-STA 272 can perform the power saving by stopping demodulating the data frame. If the HEW-STA 272 corresponds to the destination of the data frame, the HEW-STA 272 does not perform the power saving and demodulates the data frame (S317).

After receiving the CTS frame, the previous version STA 273 transmits a data frame to the HEW-AP 271 and receives an ACK frame from the HEW-AP 271 in response to the data frame.

Next, a WLAN to which a frame transmitting method or a frame receiving method according to embodiments of the present invention is applied is described with reference to FIG. 32 to FIG. 36.

Figure 32:
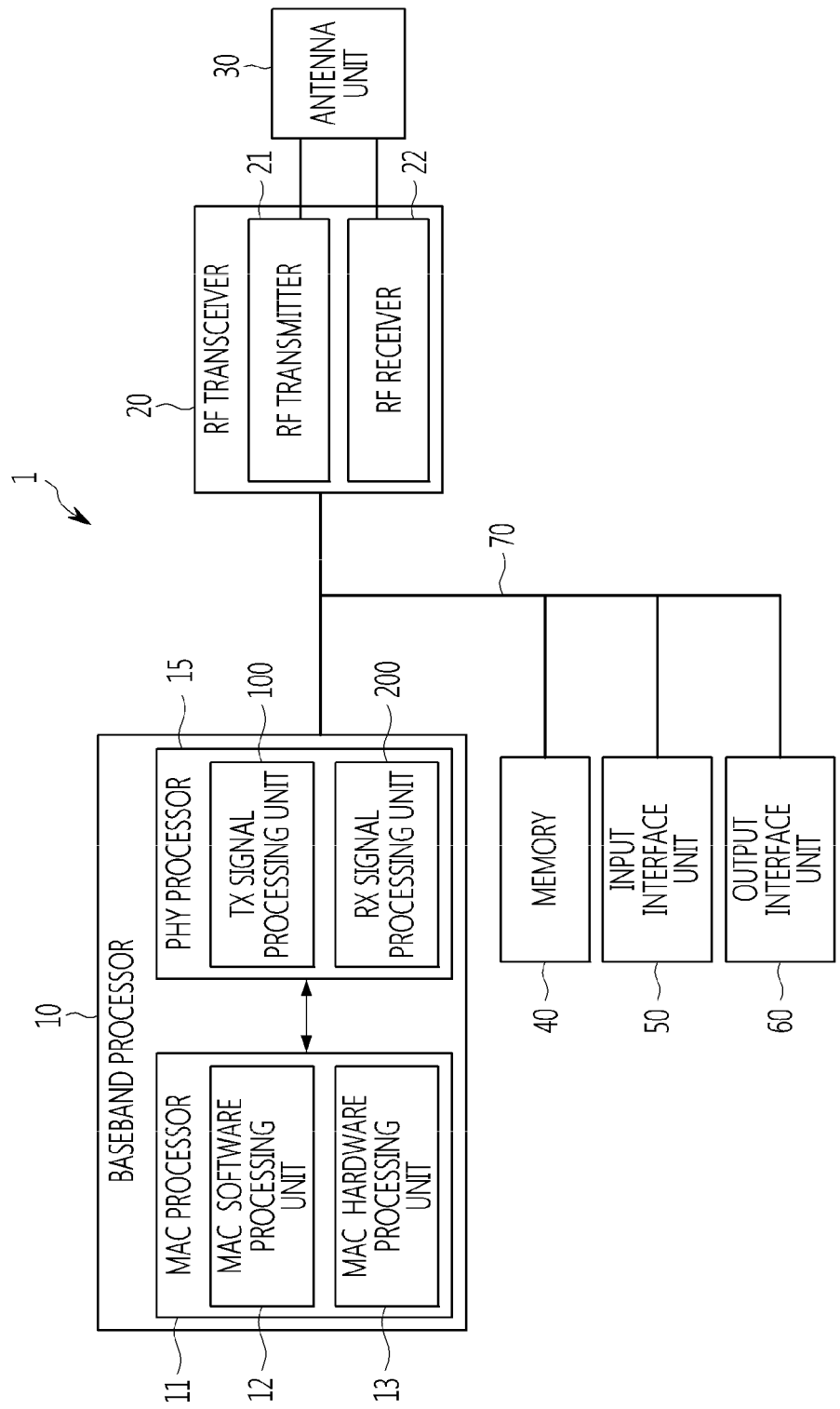
FIG. 32 is a schematic block diagram exemplifying a WLAN device.

FIG. 32 is a schematic block diagram exemplifying a WLAN device.

Referring to FIG. 32, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to as "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 33:
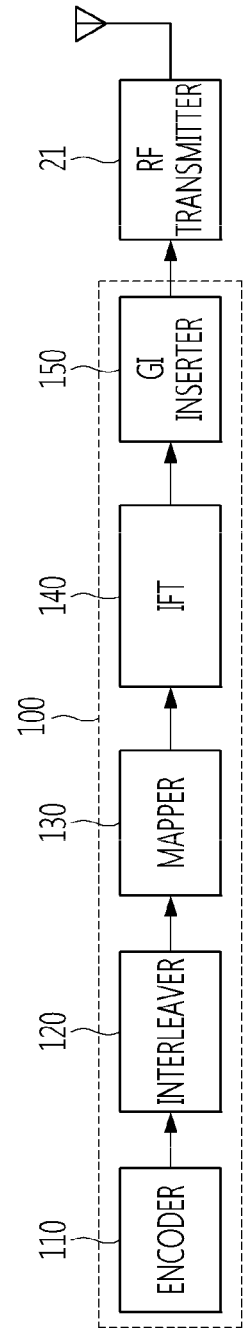
FIG. 33 is a schematic block diagram exemplifying a transmitting signal processor in a WLAN.

FIG. 33 is a schematic block diagram exemplifying a transmitting signal processor in a WLAN.

Referring to FIG. 33, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 34:
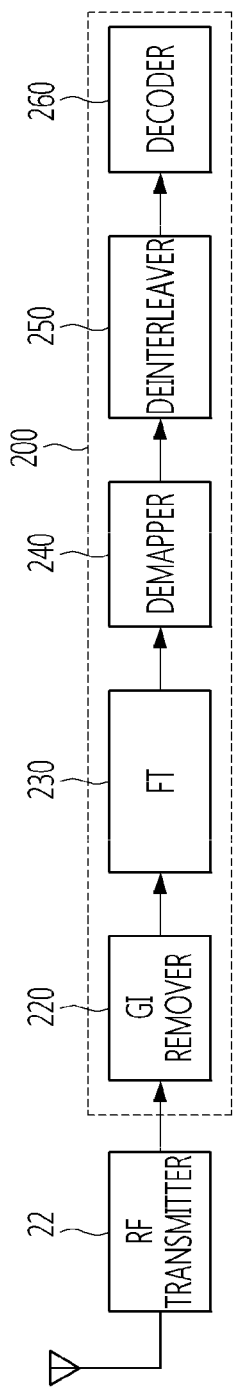
FIG. 34 is a schematic block diagram exemplifying a receiving signal processing unit in the WLAN.

FIG. 34 is a schematic block diagram exemplifying a receiving signal processing unit in the WLAN.

Referring to FIG. 34, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 35:
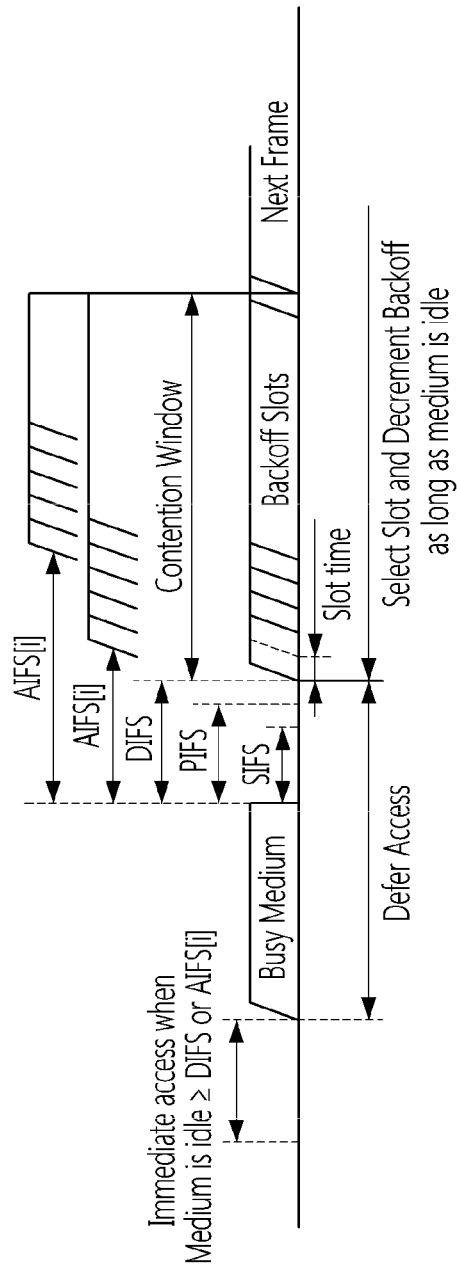
FIG. 35 exemplifies IFS relationships.

FIG. 35 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

Figure 36:
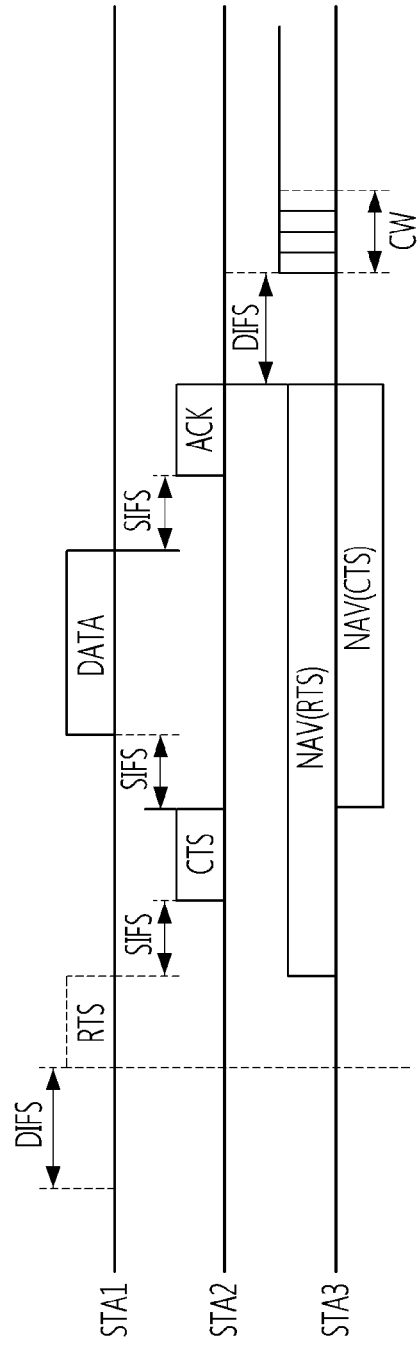
FIG. 36 is a schematic diagram explaining a CSMA/CA based frame transmission procedure for avoiding collision between frames in a channel.

FIG. 36 is a schematic diagram explaining a CSMA (carrier sense multiple access)/CA (collision avoidance) based frame transmission procedure for avoiding collision between frames in a channel.

Referring to FIG. 36, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

Next, a frame transmission apparatus in a wireless communication network according to an embodiment of the present invention is described with reference to FIG. 32.

A frame transmitting method or a frame receiving method according to above embodiments of the present invention may be executed by a frame transmitting apparatus or a frame receiving apparatus including a baseband processor 10 of shown in FIG. 32 to FIG. 34. In one embodiment, instructions for executing the frame transmission method according to above embodiments of the present invention may be stored in a recording medium such as a memory 40. In another embodiment, at least some of the instructions may be MAC software. In yet another embodiment, at least some of the instructions may be transmitted from a recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A method of receiving a frame by a device in a wireless local area network (WLAN), the method comprising:
   receiving a frame where a symbol is attached to a previous version frame, the symbol including basic service set (BSS) information;
   determining whether the device belongs to a BSS of a transmitter of the frame based on the BSS information, and
   setting a clear channel assessment (CCA) level based on whether the device belongs to the BSS of the transmitter of the frame,
   wherein the CCA level is set to a first level when the device belongs to the BSS of the transmitter of the frame and is set to a second level being higher than the first level when the device does not belong to the BSS of the transmitter of the frame.

2. The method of claim 1, wherein the frame includes a request to send (RTS) frame or a clear to send (CTS) frame.

3. The method of claim 1, wherein the previous version frame includes a frame supporting at least one of IEEE standard 802.11a, IEEE standard 802.11g, IEEE standard 802.11n, or IEEE standard 802.11ac.

4. The method of claim 1, wherein the BSS information is generated based on some bits of an identifier of the BSS.

5. The method of claim 4, wherein the BSS information is generated based on some bits of an association identifier (AID).

6. The method of claim 1, wherein the symbol is attached to an end of the previous version frame.

7. The method of claim 1, wherein the symbol further includes an indication for indicating any one of an uplink and a downlink.

8. The method of claim 1, wherein the symbol further includes an indication for indicating a version of the frame.

9. A frame receiving apparatus in a wireless local area network (WLAN), comprising:
   a transceiver configured to receive a frame where a symbol is attached to a previous version frame, the symbol including basic service set (BSS) information; and
   a processor configured to determine whether a device including the frame receiving apparatus belongs to a BSS of a transmitter of the frame based on the BSS information,
   wherein the processor sets a clear channel assessment (CCA) level based on whether the device belongs to the BSS of the transmitter of the frame, and
   wherein the CCA level is set to a first level when the device belongs to the BSS of the transmitter of the frame and is set to a second level being higher than the first level when the device does not belong to the BSS of the transmitter of the frame.

10. The frame receiving apparatus of claim 9, wherein the frame includes a request to send (RTS) frame or a clear to send (CTS) frame.

11. The frame receiving apparatus of claim 9, wherein the previous version frame includes a frame supporting at least one of IEEE standard 802.11a, IEEE standard 802.11g, IEEE standard 802.11n, or IEEE standard 802.11ac.

12. The frame receiving apparatus of claim 9, wherein the BSS information is generated based on some bits of an identifier of the BSS.

13. The frame receiving apparatus of claim 12, wherein the BSS information is generated based on some bits of an association identifier (AID).

14. The frame receiving apparatus of claim 9, wherein the symbol is attached to an end of the previous version frame.

15. The frame receiving apparatus of claim 9, wherein the symbol further includes an indication for indicating any one of an uplink and a downlink.

16. The frame receiving apparatus of claim 9, wherein the symbol further includes an indication for indicating a version of the frame.

* * * * *